United States Patent [19]

Ripka

[11] Patent Number: 5,076,494
[45] Date of Patent: Dec. 31, 1991

[54] INTEGRATED HOT WATER SUPPLY AND SPACE HEATING SYSTEM

[75] Inventor: Chester D. Ripka, East Syracuse, N.Y.

[73] Assignee: Carrier Corporation, Syracuse, N.Y.

[21] Appl. No.: 698,249

[22] Filed: May 6, 1991

Related U.S. Application Data

[63] Continuation of Ser. No. 452,038, Dec. 18, 1989, abandoned.

[51] Int. Cl.⁵ .............................................. F24D 3/08
[52] U.S. Cl. ...................................... 237/19; 126/101
[58] Field of Search .................... 237/8 R, 19, 55, 16, 237/17, 59, 7, 56; 122/20 B; 126/101

[56] References Cited

U.S. PATENT DOCUMENTS

| | | | |
|---|---|---|---|
| 3,999,709 | 12/1976 | Estabrook | 237/19 X |
| 4,178,907 | 12/1979 | Sweat, Jr. | 237/19 X |
| 4,403,572 | 9/1983 | Gerstmann et al. | 122/20 B |
| 4,406,136 | 9/1983 | Picchiottino | 62/238.6 |
| 4,429,830 | 2/1984 | Förster et al. | 237/19 |
| 4,572,111 | 2/1986 | Bowen | 122/17 |
| 4,640,458 | 2/1987 | Casier et al. | 237/17 |
| 4,641,631 | 2/1987 | Jatana | 126/101 |
| 4,798,240 | 1/1989 | Gerstmann et al. | 165/48.1 |
| 4,823,770 | 4/1989 | Loeffler | 126/362 |

FOREIGN PATENT DOCUMENTS 2355251 1/1978 France .............................. 237/19

*Primary Examiner*—Henry A. Bennet

[57] ABSTRACT

An integrated system for both space and water heating. Heating is accomplished in a condensing heating module having a small hot water storage reservoir to reduce burner cycling during periods of low demand. The space heating system includes a fluid flow loop with a fluid circulating pump for circulating a heat transfer fluid in the loop from the heating module to a remote space heating heat exchanger. The heating module can also supply hot water for service use. The system may be configured either as an open loop system, in which the space heating and water heating subsystem are combined and share common lines, or a closed loop system, in which the space heating subsystem fluid flow loop is isolated from the water heating subsystem.

24 Claims, 2 Drawing Sheets

INTEGRATED HOT WATER SUPPLY AND SPACE HEATING SYSTEM

This application is a continuation of application Ser. No. 452,038, filed Dec. 18, 1989, abandoned.

FIELD OF THE INVENTION

This invention relates generally to an integrated system for space heating and for heating water for general service use. Specifically, the invention relates to a heating system having a water heating module employing the latent heat of condensation of the hot gases of combustion from the system burner to preheat fluids entering the relatively small fluid heating volume of the module and thus achieving a high thermal efficiency.

DESCRIPTION OF THE PRIOR ART

Conventional space heating systems using a central furnace all operate on the same general principles. Air for a space to be heated is circulated through and is heated by a heat exchanger. The heat exchanger may be in contact with the burning fuel and its hot gases of combustion or in contact with a secondary fluid which has been heated by a burning fuel. Such systems are usually either of the forced air or hydronic type, but may be a combination of both. Most such systems in general use have indirect furnaces, in which the air being heated is not in direct contact with the burning fuel or its gases of combustion.

In a conventional forced air heating system, the furnace has a combustion chamber in which a flame generates heat and gases of combustion. The heat and combustion gases rise through an attached heat exchanger before exiting through a flue or chimney. Air from the space to be heated is circulated around the exterior of the heat exchanger where it is heated by convection and conduction from the heat exchanger.

In a conventional hydronic heating system, a fluid is heated in a heat exchanger in contact with burning fuel within a furnace. The fluid heat exchanger is in a closed loop by which heated fluid is circulated to radiators located in the space to be heated. The air in the space is usually heated by convective flow around the radiators.

In a combination system, a fluid is heated as in a hydronic system, but then circulates through a closed loop to a heat exchanger, where forced air passes over the heat exchanger to be heated before being circulated as in a conventional forced air heating system.

Convection water heaters used to supply hot water for general domestic and other uses in houses and other buildings usually consist of a relatively large hot water storage tank. Cold water enters the tank, where it is heated by a flame burner located at the bottom of the tank. A flue generally passes from the combustion chamber at the bottom of the tank through the tank to carry gases of combustion produced by the burner to an external flue or chimney. In most residential and commercial installations, the system for heating water is separate from the system for space heating.

Both space heating furnaces and hot water heaters of conventional design exhaust the gases of combustion to the atmosphere through flues or chimneys while the gases are still relatively hot (sometimes in excess of 500° F.), resulting in relatively low thermal efficiencies, as much of the energy contained in the burning fuel is lost "up the flue" without heating air or water. Ambient heat losses from the relatively large volume of water in conventional hot water heaters contribute to the degradation of efficiency in those systems.

The relatively low thermal efficiency of conventional space and hot water heating systems result in higher operating costs over the life of such systems. In addition, those systems are relatively costly to install, because of the cost of the chimney or flue required, and, as is usually the case, the necessity to provide separate fuel lines and separate chimneys or flues for each of the separate space heating and water heating systems.

Economic and environmental considerations have led to increased interest in improving the thermal efficiency and eliminating energy waste in the design and construction of space and water heating systems. There is also interest in producing compact heating units which will occupy a minimum of space within buildings. Generally, however, an increase in furnace efficiency does not necessarily result in a reduction of size, because the structure of the furnace is determined by the requirement for relatively large heat exchanger surface areas to transfer heat from the burning fuel and hot combustion gases to the space air or heat transfer fluid. Similarly, hot water heater size has not decreased, but in some modern, more energy efficient designs, it has actually increased.

There is, therefore, a continued, demonstrated need for a compact, yet highly efficient integrated system for space and water heating.

SUMMARY OF THE INVENTION

An object of the present invention is to combine, in a single integrated system, the functions of both space and water heating.

Another object of the present invention is to achieve high thermal efficiency in a compact system for both space and water heating.

A further object of the invention is to attain the capability, in a compact system, to supply instantaneous and continuous hot water service and simultaneously to heat a space or spaces yet, at the same time, to minimize burner cycling during periods of lower intermittent demand for hot water.

These and other objects of the invention are attained in an integrated system having a heating module which supplies heated fluid to a fluid flow loop. The fluid is circulated in the loop to a space heating heat exchanger by a circulating pump. The module also supplies heated water for general domestic or other use. The heating module is of the high thermal efficiency condensing type and contains storage for a small volume of heated water to supply small intermittent hot water demands. The system may be configured to operate on an open loop principle, in which space heating and water heating subsystems are combined and share common lines, or a closed loop system, in which the space heating subsystem is isolated from the water heating subsystem.

The novel features embodied in the invention are pointed out in the claims which form a part of this specification. The drawings and descriptive matter describe in detail the advantages and objects attained by the invention.

BRIEF DESCRIPTION OF THE DRAWINGS

The accompanying drawings form a part of the specification. Throughout the drawings, like reference numbers designate like or corresponding elements.

DESCRIPTION OF THE PREFERRED EMBODIMENTS

Figure 1:
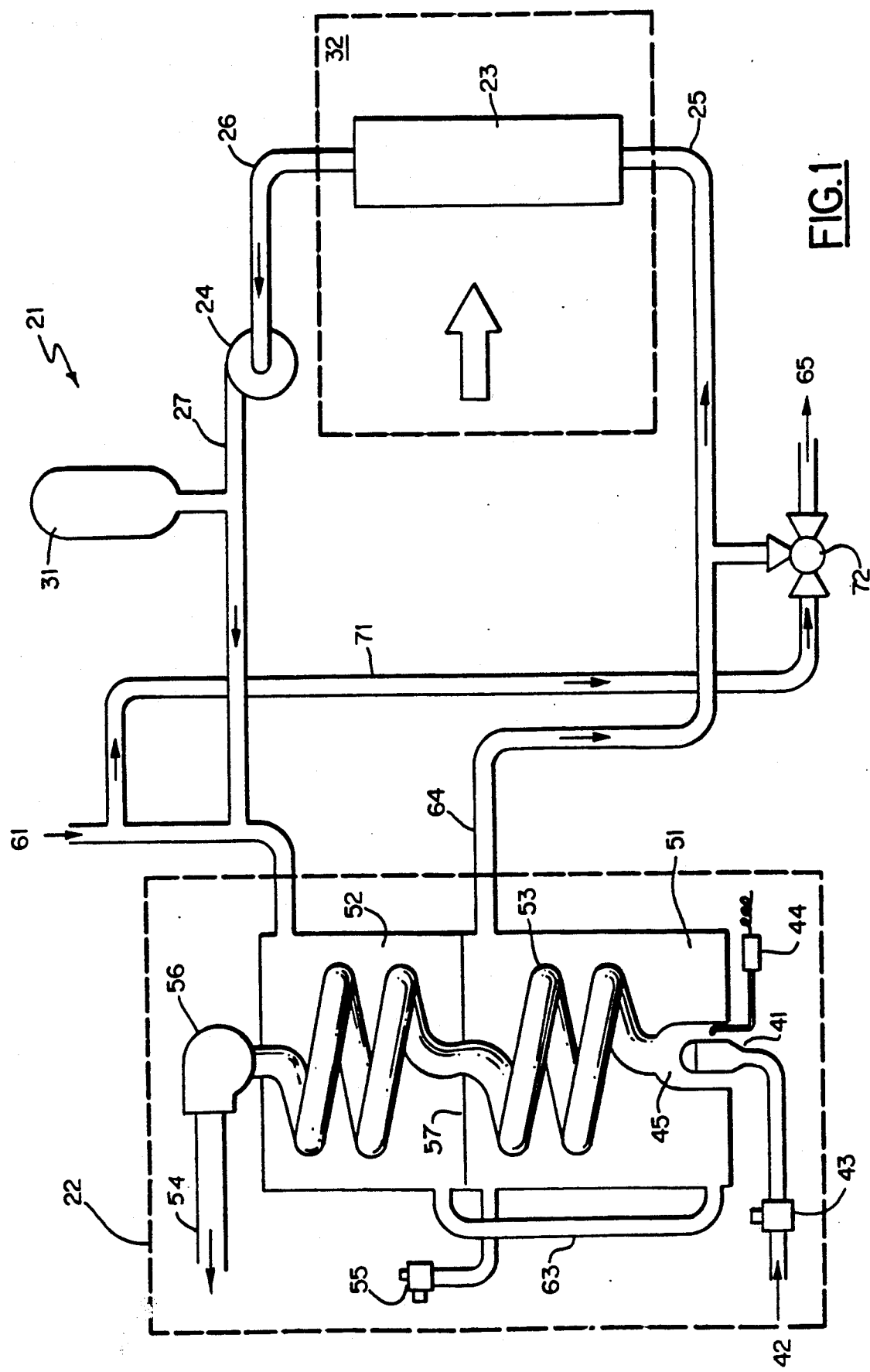
FIG. 1 is a schematic representation of one embodiment of the present invention, in which the system operates on an open loop principle, i.e. the entire system is filled with potable water and service hot water is drawn directly from the same source that supplies hot water to the space heating heat exchanger.

FIG. 1 depicts schematically one preferred embodiment of the invention, in which the system operates in an open loop principle, i.e. the entire system is filled with potable water and service hot water is drawn from the same source that supplies hot water to the space heating heat exchanger.

In FIG. 1, heating system 21 includes an integrated heating module 22, space heating heat exchanger 23 and a circulating fluid loop. Space heating heat exchanger 23 typically may be a plate fin heat exchanger or a radiator having air flowing through it in the direction of the large arrow into the space 32 to be heated. Air in space 32 may circulate through heat exchanger 23 by convection or be forced through by a fan. Heat exchanger 23 receives hot water from heating module 22 through inlet pipe 25. Water circulates from space heating heat exchanger 23 through outlet pipe 26 to circulating fluid pump 24, then is returned to heating module 22 through pump discharge pipe 27. Expansion tank 31 is connected to pump discharge pipe 27 to provide volume for expansion of water as it is heated and to dampen any pressure surges in the system.

Heating module 22 includes burner 41 in burner cavity 45 supplied with combustible gas 42 through regulator 43. The burner may be a conventional ribbon type, a jet or "inshot" burner or preferably, a radiant infrared burner. Ignition device 44, which initially lights the burner on start-up of the module, is a conventional furnace control not discussed in detail here. In such a control, a spark ignition or hot surface igniter system ignites the burner and a flame detector senses whether combustion actually occurs.

Within heating module 22 are heater tank 51 and preheater 52 separated by partition 57. Partition 57 may be insulated. Water in heater tank 51 is heated by heat from burner 41 and tank flue 53. The volume of heater tank 51 is sized to provide a small amount of stored hot water to reduce burner cycling during periods of low demand on the system. Pressure relief valve 55 protects heater tank 51 from overpressure. Tank flue 53 extends from burner cavity 45 through heater tank 51, partition 57 and preheater 52. Induction draft unit 56, such as a fan, draws on tank flue 53, causing a flow of gases of combustion from burner cavity 45, through tank flue 53 and out of the module to external vent flue 54 from which the gases are exhausted to the atmosphere. Gas flow through burner 41, burner cavity 45, tank flue 53 and vent flue 54 may also be effected by use of a blower upstream in the gas flow path. Heat is transferred to water in heater tank 51 and preheater 52 from the hot gases of combustion in tank flue 53.

Cold makeup water is supplied to the system via cold water inlet 61 from a source of water such as a potable water supply line. A check valve (not shown) may be installed in the potable water supply line upstream of cold water inlet 61 to prevent back flow into the line from system 21. Cool water returning from space heating heat exchanger 23 through pump discharge pipe 27 mixes with makeup water, if any, from cold water inlet 61 and enters preheater 52. In preheater 52, the cool water is preheated by hot gases of combustion in tank flue 53 before entering heater tank 51 via preheater-to-heater tank water transfer line 63. The preheating process also serves to condense combustion gases in tank flue 53, increasing the thermal efficiency of the module.

Hot water is drawn from heating module 22 via heater tank hot water outlet 64 on demand from either space heating heat exchanger 23 or from hot water service line 65. A thermostatic control device, not shown, is set to control the temperature of the hot water in heater tank 51. If the set temperature at heater tank hot water outlet 64 is greater than that desired in hot water service line 65, optional tempering valve 72, controlled by a thermostat (not shown), and tempering water supply line 71 can be provided to mix cold water from cold water supply 61 with hot water from heater tank hot water outlet 64 to achieve the desired water temperature in hot water service line 65.

Figure 2:
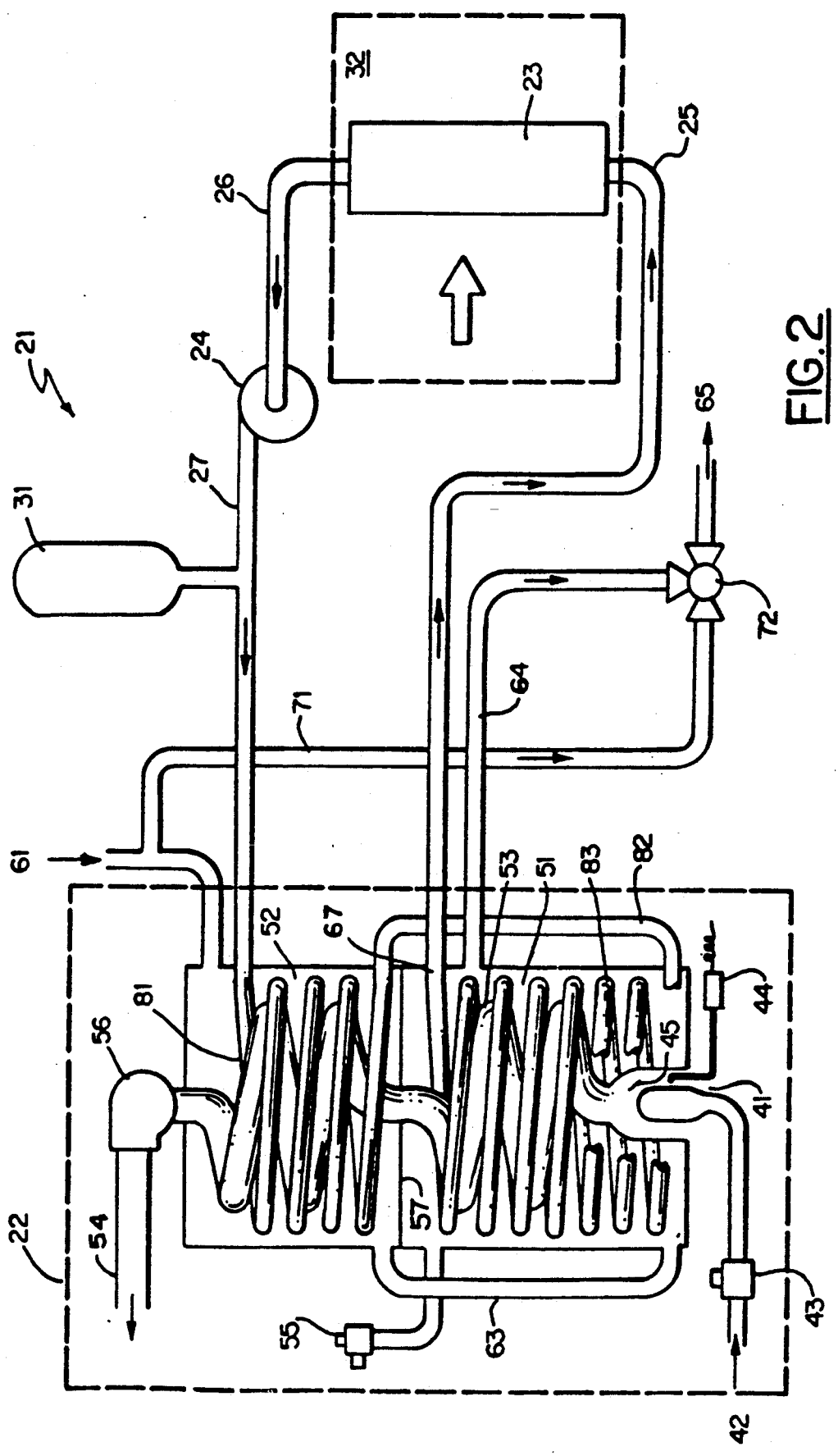
FIG. 2 is a schematic representation of another embodiment of the present invention, in which the system operates on a closed loop principle, i.e. the loop subsystem supplying heated fluid to the space heating heat exchanger is closed and separate from the subsystem for heating service hot water.

FIG. 2 is a schematic representation of another of the preferred embodiments of the invention, in which the system operates on a closed loop principle, i.e. the loop supplying heat transfer fluid to the space heating heat exchanger is closed and separate from the subsystem for heating service hot water. The heat transfer fluid in the space heating loop may be water, but preferably a mix of water and glycol.

A number of elements of the closed loop embodiment of the present invention are common or have like function to similar elements of the embodiment disclosed in the above description of the open loop system. Features that are common to the two embodiments and function similarly have the same reference numbers in the closed loop embodiment depicted in FIG. 2 as in the open loop embodiment depicted in FIG. 1. The major differences in the two embodiments are in the internal configurations of the heating modules and the connections of the modules to the remainder of the system made necessary by the requirement, in the closed loop embodiment, to isolate the space heating subsystem from the hot water service subsystem.

Referring to FIG. 2 and the above description of the open loop system shown in FIG. 1, heat transfer fluid for space heating is heated within heating module 22 by fluid heater 83 which is immersed in the water volume of heater tank 51 of heating module 22. Heat transfer fluid circulates from heating module 22 through a closed loop from heater tank hot liquid outlet 67 through heat exchanger inlet pipe 25, space heating heat exchanger 23, where heat is transferred to air to be heated, heat exchanger outlet pipe 26, circulating fluid pump 24 and pump discharge pipe 27 before returning to heating module 22. There is no mixing of the heat transfer fluid with water from cold water supply 61. Within preheater 52 of heating module 22 is fluid preheater 81, immersed in the water volume of preheater 52. When system 21 is operating, the water volume in preheater 52 will generally be at a higher temperature than the returning heat transfer fluid in fluid preheater 81. The water volume will therefore preheat the heat transfer fluid in fluid preheater 81, thus reducing the temperature of the water volume in preheater 52 and enhancing the condensation of the gases of combustion in tank flue 53. From fluid preheater 81, the heat transfer fluid flows to fluid heater 83 in heater tank 51 of heating module 22 via fluid preheater-to-fluid heater transfer line 82. Water to be heated for hot water service is taken from cold water supply 61 and flows through preheater 52, where it is preheated by and condenses the hot gases of combustion in tank flue 53. The preheated water then flows through preheater-to-heater tank water transfer line 63 into heater tank 51, where it is heated by heat from burner 41 and tank flue 53. Hot water is drawn from heating module 22 via heater tank hot water outlet 64 on demand from hot water service line 65. If necessary optional tempering valve 72, controlled by a thermostat (not shown), which mixes water from cold water supply 61 with hot water from heater tank hot water outlet 64 via tempering water supply line 71, can be provided to achieve the desired hot water service supply temperature.

The physical size and operating parameters of the system embodying the invention are variable and depend on the specific application to which the system is put. For use in a typical residential application, the heating module would have a heating capacity of approximately 110,000 BTU/HR. In such an installation, the volume of the heater tank 51 in the heating module 22 would be about six U.S. gallons. Satisfactory space heating performance should be attained with heater tank outlet temperatures in the range of 120° F.–200° F. If that range is greater than that desired in the hot water service line, the heater tank output can be tempered to attain the desired service line water temperature.

The open loop embodiment offers the advantages of reduced cost and less complexity over the closed loop embodiment. However, the closed loop system may have advantages in certain applications, such as where local building or plumbing codes prevent the use of open loop systems.

While two preferred embodiments of the present invention are shown and described, those skilled in the art will appreciate that many variations may be constructed and yet remain within the scope of the invention. As discussed above, the system of the invention may be made in a wide range of sizes and heating capacity for use in a variety of applications. The drawings show a single space heating heat exchanger while the system may be configured with more than one such heat exchanger. The system could be used as solely a hydronic space heating system or solely as a water heating system. It is intended, therefore, that the scope of the present invention be limited only by the scope of the below claims.

What is claimed is:

1. An integrated heating system capable of supplying service hot water, heated heat transfer fluid for space heating or both comprising:
    flow loop means;
    means for circulating a heat transfer fluid through said flow loop means;
    heating module means through which passes a portion of said flow loop and by which said heat transfer fluid is heated, said heating module means comprising
    (a) water preheating means above and in series water flow communication upstream of water heating tank means,
    (b) a burner cavity extending into said water heating tank means and in heat exchange relationship with water in said water heating tank means,
    (c) a burner disposed within said burner cavity,
    (d) flue means for conducting gases of combustion from said burner cavity through and in heat exchange relationship with both said water heating tank means and said water preheating means and out of said heating module means, and
    (e) means for causing a flow of gases of combustion in said flue means;
    when said integrated heating system is used to supply heated heat transfer fluid, heat transfer fluid-to-air heat exchanger means in said flow loop means for transferring heat from said heat transfer fluid to air in heat exchange relationship with said heat transfer fluid-to-air heat exchanger means; and
    when said integrated heating system is used to supply service hot water, means for connecting a heating module hot water outlet to a service hot water line.

2. An integrated heating system as in claim 1 in which the flow of said heat transfer fluid is counter to the flow of said gases of combustion in the portion of said flue means that is located in said water preheating means and parallel to the flow of said gases of combustion in the portion of said product flue means that is located in said water heating tank means.

3. An integrated heating system as in claim 1 further comprising mixing or tempering means in said connecting means for mixing or unheated water with heated water.

4. An integrated heating system as in claim 1 in which said water preheating means and said water heating tank means are adjacent but separated by a partition.

5. An integrated heating system as in claim 4 in which said partition is insulated.

6. An integrated heating system as in claim 1 in which said flow causing means comprises an induction fan.

7. An integrated heating system as in claim 1 in which said flow loop means is an open loop and said heat transfer fluid is water.

8. An integrated heating system as in claim 7 in which the flow of said heat transfer fluid is counter to the flow of said gases of combustion in the portion of said flue means that is located in said water preheating means and parallel to the flow of said gases of combustion in the portion of said flue means that is located in said water heating means.

9. An integrated heating system as in claim 7 further comprising mixing or tempering means in said connecting means for mixing unheated water with heated water.

10. An integrated heating system as in claim 7 in which said water preheating means and said water heating tank means are adjacent but separated by a partition.

11. An integrated heating system as in claim 10 in which said partition is insulated.

12. An integrated heating system as in claim 7 in which said flow causing means comprises an induction fan.

13. An integrated heating system as in claim 1 in which said flow loop means is a closed loop and said heating module means further comprises:
    heat transfer fluid preheating means in heat transfer relationship with water in said water preheating means; and p1 heat transfer fluid heating means in heat transfer relationship with water in said water heating tank means; with
    said heat transfer fluid preheating means being in series flow relationship upstream in said flow loop means from said heat transfer fluid heating means.

14. An integrated heating system as in claim 13 in which the flows of said water and said heat transfer fluid are both counter to the flow of said gases of combustion in the portion of said flue means that is located in said water preheating means and parallel to the flow of said gases of combustion in the portion of said flue means that is located in said water heating tank means.

15. An integrated heating system as in claim 13 further comprising mixing or tempering means in said connecting service hot water supply means for mixing unheated water with heated water.

16. An integrated heating system as in claim 13 in which said water preheating means and said water heating tank means are adjacent but separated by a partition.

17. An integrated heating system as in claim 13 in which said partition is insulated.

18. An integrated heating system as in claim 13 in which said flow causing means comprises an induction fan.

19. An integrated heating system capable of supplying service hot water, heated heat transfer fluid for space heating or both comprising: closed flow loop means;
  means for circulating a heat transfer fluid through said closed flow loop means;
  heating module means through which passes a portion of said closed flow loop and by which said heat transfer fluid is heated, said heating module means comprising
  (a) water preheating means in series water flow communication with and upstream of water heating means,
  (b) a burner cavity extending into said water heating means and in heat exchange relationship with water in said water heating means,
  (c) a burner disposed within said burner cavity,
  (d) flue means for conducting gases of combustion from said burner cavity through and in heat exchange relationship with both said water heating means and said water preheating means and out of said heating module means,
  (e) means for causing a flow of gases of combustion in said flue means,
  (f) heat transfer fluid preheating means in heat transfer relationship with water in said water preheating means, and
  (g) heat transfer fluid heating means in heat transfer relationship with water in said water heating means and in series flow relationship upstream in said closed flow loop means from said heat transfer fluid heating means;
  when said integrated heating system is used to supply heated heat transfer fluid, heat transfer fluid-to-air heat exchanger means in said flow loop means for transferring heat from said heat transfer fluid to air in heat exchanger relationship with said heat transfer fluid-to-air heat exchanger means; and
  when said integrated heating system is used to supply service hot water, means for connecting a heating module hot water outlet to a service hot water line.

20. An integrated heating system as in claim 19 in which the flows of said water and said heat transfer fluid are both counter to the flow of said gases of combustion in the portion of said flue means that is located in said water preheating means and parallel to the flow of said gases of combustion in the portion of said flue means that is located in said water heating tank means.

21. An integrated heating system as in claim 19 further comprising mixing or tempering means in said connecting service hot water supply means for mixing unheated water with heated water.

22. An integrated heating system as in claim 19 in which said water preheating means and said water heating tank means are adjacent but separated by a partition.

23. An integrated heating system as in claim 19 in which said partition is insulated.

24. An integrated heating system as in claim 19 in which said flow causing means comprises an induction fan.

* * * * *